(12) United States Patent
Osanai et al.

(10) Patent No.: US 11,505,052 B2
(45) Date of Patent: Nov. 22, 2022

(54) VEHICLE

(71) Applicant: TOYOTA JIDOSHA KABUSHIKI KAISHA, Toyota (JP)

(72) Inventors: Kiyoshi Osanai, Kariya (JP); Toshinobu Ogura, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 17/226,695

(22) Filed: Apr. 9, 2021

(65) Prior Publication Data

US 2021/0362576 A1 Nov. 25, 2021

(30) Foreign Application Priority Data

May 25, 2020 (JP) .............................. JP2020-090911

(51) Int. Cl.
*B60J 10/86* (2016.01)
*B60J 5/04* (2006.01)
*B60J 10/84* (2016.01)

(52) U.S. Cl.
CPC ............. *B60J 10/86* (2016.02); *B60J 5/0402* (2013.01); *B60J 10/84* (2016.02)

(58) Field of Classification Search
CPC .......... B60J 10/80; B60J 10/86; B60J 5/0402; B60R 13/04
See application file for complete search history.

(56) References Cited

U.S. PATENT DOCUMENTS

| 6,739,094 B1* | 5/2004 | Berry ....................... B60J 10/38 |
| | | 49/478.1 |
| 6,932,415 B1* | 8/2005 | Van Houzen ............ B60J 10/24 |
| | | 49/498.1 |
| 8,459,723 B2* | 6/2013 | Stoll ........................ B60J 10/84 |
| | | 296/146.7 |
| 8,695,279 B2* | 4/2014 | Sato ........................ B60R 13/04 |
| | | 49/490.1 |
| 10,343,506 B2* | 7/2019 | Tamao .................... B60J 5/0418 |
| 10,457,224 B2* | 10/2019 | Katayama ............... B60R 13/04 |
| 10,654,349 B2* | 5/2020 | Matsuura ............... E06B 7/2312 |
| 10,946,730 B2* | 3/2021 | Jeon ........................ B60J 5/0455 |
| 10,967,717 B2* | 4/2021 | Sasaki ..................... B60J 10/36 |
| 11,247,545 B2* | 2/2022 | Tawada ................... B60J 10/86 |

(Continued)

FOREIGN PATENT DOCUMENTS

| JP | 2006-21613 A | 1/2006 |
| JP | 2007-30706 A | 2/2007 |

*Primary Examiner* — Jason S Morrow
(74) *Attorney, Agent, or Firm* — Oliff PLC

(57) ABSTRACT

A vehicle may include: a body including an opening; a door constituted of metal, the door being configured to open and close the opening; a rail garnish constituted of resin, the rail garnish being disposed along an edge of the opening; and a seal member disposed along an edge of the door and configured to seal a gap between the door and the body when the door closes the opening. The rail garnish may include a fixed portion, a contact portion, and a first bend and a second bend disposed between the fixed portion and the contact portion. The first bend and the second bend each may extend along the contact portion in a longitudinal direction of the rail garnish and are bent in different directions. A thickness of the rail garnish may be locally small at one or both of the first bend and the second bend.

6 Claims, 2 Drawing Sheets

(56) References Cited

U.S. PATENT DOCUMENTS

| | | | |
|---|---|---|---|
| 2011/0099911 A1* | 5/2011 | Ellis | B60J 5/0402 49/475.1 |
| 2015/0283888 A1* | 10/2015 | Togashi | B60J 10/15 49/480.1 |
| 2020/0130488 A1* | 4/2020 | Choi | B60J 10/36 |
| 2021/0362576 A1* | 11/2021 | Osanai | B60R 13/04 |
| 2022/0118829 A1* | 4/2022 | Galluccio | B60J 1/17 |

* cited by examiner

VEHICLE

CROSS-REFERENCE TO RELATED APPLICATION

This application claims priority to Japanese Patent Application No. 2020-90911, filed on May 25, 2020, the entire contents of which are incorporated herein by reference.

TECHNICAL FIELD

The art disclosed herein relates to a vehicle. In particular, it relates to a sealing structure between a body and a door.

BACKGROUND

Japanese Patent Application Publication No. 2006-21613 describes a vehicle. This vehicle includes a body including an opening, a door that is disposed at the opening of the body and opens and closes the opening, and a seal member disposed along an edge of the door. The seal member comes into contact with an edge of the opening of the body and thereby seals a gap between the door and the body when the door closes the opening.

SUMMARY

The body and the door of the above vehicle are constituted of metal. According to such a configuration, when a temperature of the vehicle rises or falls, thermal distortion (thermal expansion or thermal contraction) may occur to each of the body and the door to the same extent. Accordingly, even when the vehicle is in various temperature environments, the gap between the body and the door barely changes and hermeticity therebetween is easily maintained. On the other hand, at least a part of the body may be constituted of resin in order to reduce weight of the vehicle, for example. In this case, since a linear expansion coefficient of resin and a linear expansion coefficient of metal are different from each other, thermal distortion occur differently to part(s) constituted of resin and configuring the body, and the door constituted of metal. Accordingly, when the vehicle is in the various temperature environments, the gap between the body and the door greatly changes, by which the hermeticity therebetween may be degraded.

In view of the above, the present disclosure provides an art that can maintain hermeticity between a body and a door even when at least a part of the body is constituted of resin.

A vehicle disclosed herein may comprise: a body comprising an opening; a door constituted of metal, the door being disposed on the body and configured to open and close the opening; a rail garnish constituted of resin, the rail garnish being disposed along an edge of the opening of the body; and a seal member disposed along an edge of the door and configured to seal a gap between the door and the body by coming into contact with the rail garnish when the door closes the opening. The rail garnish may comprise a fixed portion fixed to the body, a contact portion configured to come into contact with the seal member, and a first bend and a second bend disposed between the fixed portion and the contact portion. The first bend and the second bend may each extend along the contact portion in a longitudinal direction of the rail garnish and are bent in different directions. A thickness of the rail garnish may be locally small at one or both of the first bend and the second bend. Here, a thickness being locally small at a certain portion means that the thickness of this certain portion is smaller than other portions adjacent to the portion.

In the aforementioned vehicle, the seal member disposed on the door is configured to come into contact with the rail garnish disposed on the body. The rail garnish is constituted of resin while the door is constituted of metal, as a result of which the rail garnish may undergo greater thermal distortion than that of the door. However, the rail garnish includes the first bend and the second bend between the fixed portion fixed to the body and the contact portion that comes into contact with the seal member. The first bend and the second bend each extend in the longitudinal direction of the rail garnish and are bent in different directions. With such a configuration, the bends are distorted in different directions even when the thermal distortion occurs to the rail garnish, as a result of which the contact portion of the rail garnish can be prevented from approaching or moving away from the door. Due to this, the gap between the body and the door barely changes and hermeticity therebetween is easily maintained. Further, the thickness of the rail garnish is locally small at one or both of the first bend and the second bend. According to such a configuration, flexibility of the rail garnish can be enhanced, and the thermal distortion that occurs to the rail garnish can be absorbed or mitigated at the first bend and/or the second bend.

DETAILED DESCRIPTION

In an aspect of the art disclosed herein, a guide face supporting the contact portion of the rail garnish may be disposed on the body, and a protrusion configured to come into contact with the guide face may be disposed on a back face of the contact portion located proximate to the body. With such a configuration, when thermal distortion occurs to the rail garnish, the contact portion of the rail garnish can be guided along the guide face of the body. Due to this, the contact portion of the rail garnish can effectively be prevented from approaching or moving away from the door.

In an aspect of the art disclosed herein, the guide face of the body may extend parallel to the contact portion in a width direction of the rail garnish. According to such a configuration, the contact portion of the rail garnish is guided along the guide face, as a result of which the contact portion is prohibited from approaching or moving away from the door.

In an aspect of the art disclosed herein, the one or both of the first bend and the second bend may be located away from the guide face. In other words, a space may be provided between the guide face of the body and the rail garnish.

In an aspect of the art disclosed herein, the thickness of the rail garnish at the second bend is smaller than the thickness of the rail garnish at the first bend. In other words, the thickness at the second bend and the thickness at the first bend may be different from one another, and respective thicknesses at the first and second bends may suitably be set in accordance with properties required for the rail garnish.

In an aspect of the art disclosed herein, the one or both of the first bend and the second bend may include a portion bent in a U-shape. Since the one or both of the bends are in the U-shape, length(s) of the bent portion(s) can be longer than, for example, a bend with merely a right angle. Due to this, flexibility of the one or both of the bends can be enhanced, by which the thermal distortion that occurs to the rail garnish can be absorbed or mitigated further at the one or both of the bends.

Figure 1:
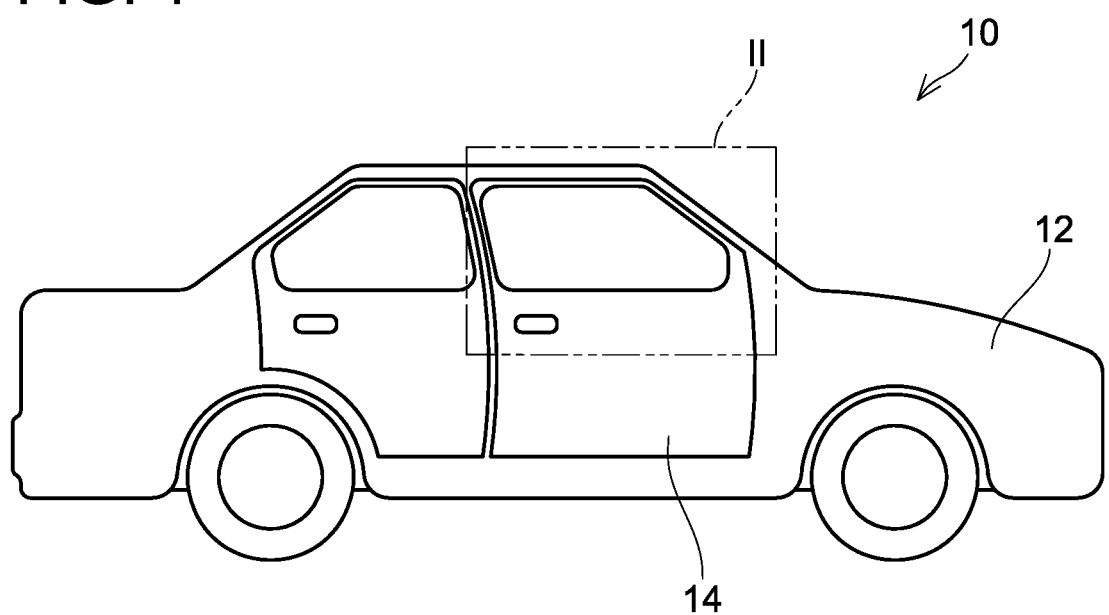
FIG. 1 shows an appearance of a vehicle 10 of an embodiment.

A vehicle 10 of a present embodiment will be described with reference to the drawings. As shown in FIG. 1, the vehicle 10 includes a body 12 and a door 14. The body 12 of the present embodiment is primarily constituted of metal and resin. Resin is used for a part of components configuring the body 12 in order to, for example, reduce weight of the vehicle 10. A specific type of metal, a specific type of resin, and a combination thereof are not particularly limited. An opening 16 is defined at a lateral portion of the body 12. The opening 16 is an opening for a user to get on and off the vehicle, and opens toward a lateral side relative to the vehicle 10. The door 14 is a movable member for opening and closing this opening 16.

Figure 3:
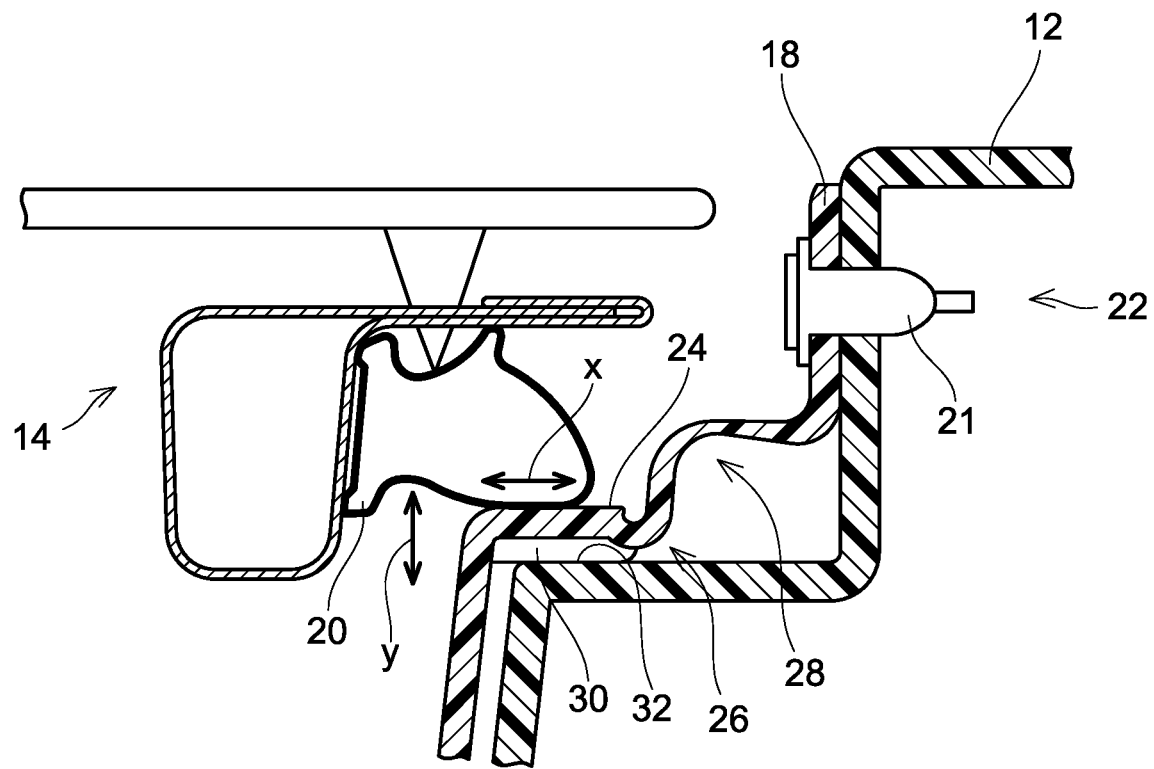
FIG. 3 shows a cross section cut along a line III-III in FIG. 2, and shows a state in which a seal member 20 disposed on the door 14 is in contact with a contact portion 24 of the rail garnish 18. Here, a y direction in FIG. 3 indicates a direction along which the door 14 faces the rail garnish 18, and a x direction in FIG. 3 indicates a direction perpendicular to the y direction.

The door 14 is attached to the vehicle 10 via an axial support (not shown). The axial support pivotably connects the door 14 to the vehicle 10. The axial support herein broadly refers to a connector which connects two members (namely, the door 14 and the body 12) to each other such that the two members can rotate within a limited angle range, and may be for example a hinge. As shown in FIG. 3, the door 14 includes a seal member 20. The seal member 20 is disposed along an edge of the door 14. When the door 14 closes the opening 16 of the body 12, the seal member 20 comes into contact with an edge of the opening 16 and thereby seals a gap between the door 14 and the body 12. The seal member 20 is constituted of resin, for example an elastic member such as rubber or an elastomer. The seal member 20 is referred to as a weatherstrip, for example.

Figure 2:
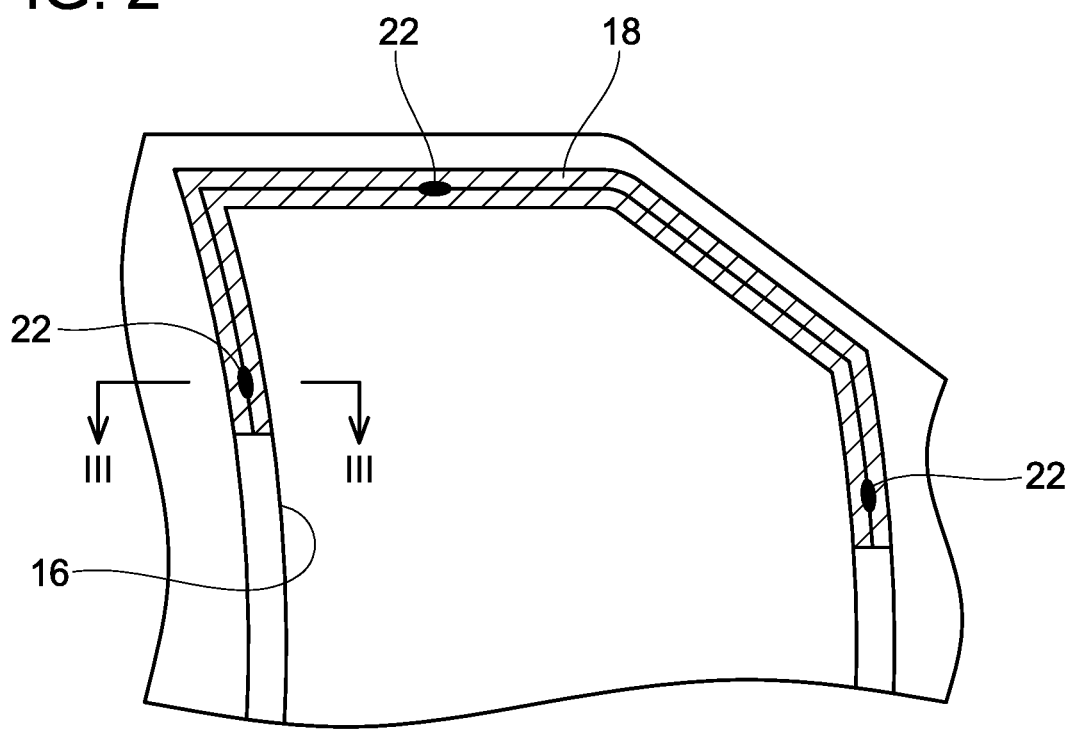
FIG. 2 shows an enlarged view of a part surrounded by a dot line II in FIG. 1, and shows a rail garnish 18 attached to an opening 16 of a body 12 of the embodiment. A door 14 is not illustrated to clearly show the rail garnish 18.

As shown in FIG. 2, the vehicle 10 further includes a rail garnish 18. The rail garnish 18 is disposed along the edge of the opening 16. When the door 14 closes the opening 16, the rail garnish 18 comes into contact with the seal member 20 disposed along the edge of the door 14, and thereby seals the gap between the door 14 and the body 12. The rail garnish 18 is constituted of resin. A type of resin is not particularly limited. The rail garnish 18 is fixed to the body 12 at fixed portions 22. The fixed portions 22 may include bolts 21, for example. The number of the fixed portions 22 is not particularly limited, and a plurality of fixed portions 22 may be provided to fix the rail garnish 18 to the body 12.

The rail garnish 18 includes a contact portion 24 that comes into contact with the seal member 20 when the door 14 closes the opening 16. As shown in FIG. 3, the rail garnish 18 further includes a first bend 26 and a second bend 28 disposed between the fixed portion 22 and the contact portion 24. The first bend 26 is disposed at a position proximate to the body 12, and the second bend 28 is disposed at a position away from the body 12. The first bend 26 and the second bend 28 each extend along the contact portion 24 in a longitudinal direction of the rail garnish 18 and are bent in different directions. With such a configuration, the bends 26, 28 are distorted in different directions even when thermal distortion occurs to the rail garnish 18. As a result, the contact portion 24 of the rail garnish 18 can be prevented from approaching or moving away from the door 14.

For example, a case will be assumed in which a temperature of the rail garnish 18 has risen and thermal expansion has occurred to the rail garnish 18. In this case, each of the two bends 26, 28 of the rail garnish 18 is displaced in a direction enlarging its bend angle. When the bend angle of the first bend 26 becomes larger, the contact portion 24 of the rail garnish 18 is displaced in a direction moving away from the door 14 (that is, displaced downward in the y direction in FIG. 3). On the other hand, when the bend angle of the second bend 28 becomes larger, the contact portion 24 of the rail garnish 18 is displaced in a direction approaching the door 14 (that is, displaced upward in the y direction in FIG. 3). Accordingly, displacement of the contact portion 24 caused by the thermal expansion of the first bend 26 and displacement of the contact portion 24 caused by the thermal expansion of the second bend 28 cancel each other. Due to this, even when the thermal expansion occurs to the rail garnish 18, the contact portion 24 of the rail garnish 18 can be prevented from approaching or moving away from the door 14.

On the other hand, for example, a case will be assumed in which the temperature of the rail garnish 18 has fallen and thermal contraction has occurred to the rail garnish 18. In this case, each of the two bends 26, 28 of the rail garnish 18 is distorted in a direction reducing its bend angle. When the bend angle of the first bend 26 becomes smaller, the contact portion 24 of the rail garnish 18 is displaced in the direction approaching the door 14 (that is, displaced upward in the y direction in FIG. 3). On the other hand, when the bend angle of the second bend 28 becomes smaller, the contact portion 24 of the rail garnish 18 is displaced in the direction moving away from the door 14 (that is, displaced downward in they direction in FIG. 3). Accordingly, displacement of the contact portion 24 caused by the thermal contraction of the first bend 26 and displacement of the contact portion 24 caused by the thermal contraction of the second bend 28 cancel each other. Due to this, even when the thermal contraction occurs to the rail garnish 18, the contact portion 24 of the rail garnish 18 can be prevented from approaching or moving away from the door 14.

As such, even when the thermal distortion (the thermal contraction or the thermal contraction) occurs to the rail garnish 18, the contact portion 24 of the rail garnish 18 can be prevented from approaching or moving away from the door 14. In the vehicle 10 of the present embodiment, since the door 14 is constituted of metal while the rail garnish 18 is constituted of resin, the thermal distortion that occurs to the rail garnish 18 is greater than thermal distortion that occurs to the door 14. Generally, when thermal distortions occurs to the door 14 and the rail garnish 18 in different manners, the gap between the door 14 and the rail garnish 18 changes, as a result of which hermeticity therebetween may be degraded or the door 14 and the rail garnish 18 may physically interfere with each other. According to the rail garnish 18 of the present embodiment, even when relatively great thermal distortion has occurred to the rail garnish 18, the gap between the body 12 and the door 14 is prevented from changing, and the hermeticity therebetween can thereby be maintained.

In addition, a thickness of the rail garnish 18 is locally small at the first bend 26 and the second bend 28. According to such a configuration, flexibility of the rail garnish 18 can be enhanced, and the thermal distortion that occurs to the rail garnish 18 can be absorbed or mitigated at the first bend 26 and the second bend 28. As another embodiment, the thickness of the rail garnish 18 may be locally small only at one of the first bend 26 and the second bend 28.

In the vehicle 10 of the present embodiment, a guide face 32 supporting the contact portion 24 of the rail garnish 18 is disposed on the body 12. The guide face 32 extends parallel to the contact portion 24 in a width direction of the rail garnish 18. In other words, the guide face 32 is perpendicular to they direction and parallel to the x direction in FIG. 3. In this case, when displaced due to the thermal distortion, the contact portion 24 of the rail garnish 18 is guided in the x direction along the guide face 32, by which the contact portion 24 can be prevented from being displaced in the y direction. Due to this, the contact portion 24 is prohibited from approaching or moving away from the door 14.

In the present embodiment, the rail garnish 18 includes a protrusion 30. The protrusion 30 is disposed on a back face of the contact portion 24 located proximate to the body 12, and is configured to come into contact with the guide face 32. According to such a configuration, when the thermal distortion has occurred to the rail garnish 18, the contact portion 24 of the rail garnish 18 can be guided along the guide face 32 of the body 12. Due to this, the contact portion 24 of the rail garnish 18 can effectively be prevented from approaching or moving away from the door 14. A shape of the protrusion 30 is not particularly limited, and the protrusion 30 only needs to be disposed such that the contact portion 24 is parallel to the door 14 when the door 14 is closed.

In the present embodiment, the thickness of the rail garnish 18 at the second bend 28 is smaller than the thickness of the rail garnish 18 at the first bend 26. In other words, the thickness at the first bend 26 and the thickness at the second bend 28 may be different from each other. Respective thicknesses at the bends 26, 28 may suitably be set in accordance with properties required for the rail garnish 18.

In the present embodiment, the first bend 26 includes a portion bent in a U-shape. Since the first bend 26 has a U-shape, a length of the bent portion can be longer than for example a bend with merely a right angle. Due to this, flexibility of the first bend 26 can be enhanced, and the thermal distortion that occurs to the rail garnish 18 can further be absorbed or mitigated at the first bend 26. Although the first bend 26 is bent in the U-shape in the present embodiment, the bend having the U-shape is not particularly limited thereto, and the second bend 28 may be bent in the U-shape, for example.

In the present embodiment, the vehicle 10 includes the two bends, i.e., the first bend 26 and the second bend 28, however, the number of the bends is not particularly limited thereto, and the vehicle 10 may include three or more bends.

What is claimed is:

1. A vehicle comprising:
   a body comprising an opening;
   a door constituted of metal, the door being disposed on the body and configured to open and close the opening;
   a rail garnish constituted of resin, the rail garnish being disposed along an edge of the opening of the body; and
   a seal member disposed along an edge of the door and configured to seal a gap between the door and the body by coming into contact with the rail garnish when the door closes the opening,
   wherein
   the rail garnish comprises a fixed portion fixed to the body, a contact portion configured to come into contact with the seal member, and a first bend and a second bend disposed between the fixed portion and the contact portion,
   the first bend and the second bend each extend along the contact portion in a longitudinal direction of the rail garnish and are bent in different directions, and
   a thickness of the rail garnish is locally small at one or both of the first bend and the second bend.

2. The vehicle according to claim 1, wherein
   a guide face supporting the contact portion of the rail garnish is disposed on the body, and
   a protrusion configured to come into contact with the guide face is disposed on a back face of the contact portion located proximate to the body.

3. The vehicle according to claim 2, wherein the guide face of the body extends parallel to the contact portion in a width direction of the rail garnish.

4. The vehicle according to claim 2, wherein the one or both of the first bend and the second bend are located away from the guide face.

5. The vehicle according to claim 1, wherein the thickness of the rail garnish at the second bend is smaller than the thickness of the rail garnish at the first bend.

6. The vehicle according to claim 1, wherein the one or both of the first bend and the second bend include a portion bent in a U-shape.

* * * * *